(12) United States Patent
Udrea et al.

(10) Patent No.: US 8,859,303 B2
(45) Date of Patent: Oct. 14, 2014

(54) IR EMITTER AND NDIR SENSOR

(75) Inventors: Florin Udrea, Cambridge (GB); Julian Gardner, Kineton (GB); Syed Zeeshan Ali, Cambridge (GB); Mohamed Foysol Chowdhury, Milton (GB); Ilie Poenaru, Cambridge (GB)

(73) Assignee: Cambridge CMOS Sensors Ltd., Cambridge (GB)

( * ) Notice: Subject to any disclaimer, the term of this patent is extended or adjusted under 35 U.S.C. 154(b) by 21 days.

(21) Appl. No.: 13/466,626

(22) Filed: May 8, 2012

(65) Prior Publication Data

US 2012/0267532 A1    Oct. 25, 2012

Related U.S. Application Data

(63) Continuation-in-part of application No. 12/691,104, filed on Jan. 21, 2010, now Pat. No. 8,410,560.

(51) Int. Cl.
*H01L 21/00* (2006.01)
*H05B 3/26* (2006.01)

(52) U.S. Cl.
CPC ..................................... *H05B 3/267* (2013.01)
USPC ........................................................... 438/22

(58) Field of Classification Search
None
See application file for complete search history.

(56) References Cited

U.S. PATENT DOCUMENTS

| | | | |
|---|---|---|---|
| 4,938,244 A * | 7/1990 | Kumada et al. | 136/212 |
| 5,285,131 A | 2/1994 | Muller et al. | |
| 5,291,142 A | 3/1994 | Ohmi | |
| 5,345,213 A | 9/1994 | Semancik et al. | |
| 5,500,569 A | 3/1996 | Blomberg et al. | |
| 5,644,676 A | 7/1997 | Blomberg et al. | |
| 5,827,438 A * | 10/1998 | Blomberg et al. | 219/544 |
| 5,834,777 A * | 11/1998 | Wong | 250/343 |
| 6,297,511 B1 | 10/2001 | Syllaios et al. | |
| 6,469,303 B1 * | 10/2002 | Sun et al. | 250/343 |
| 6,597,051 B2 | 7/2003 | Lubomirsky et al. | |

(Continued)

FOREIGN PATENT DOCUMENTS

| | | |
|---|---|---|
| EP | 2 056 337 A2 | 5/2009 |
| WO | 98/32009 | 7/1998 |
| WO | 02/080620 A1 | 10/2002 |

OTHER PUBLICATIONS

Parameswaran et al., "Micromachined Thermal Radiation Emitter from a Commercial CMOS Process", IEEE Electron Device Letters, vol. 12, No. 2, Feb. 1991.

(Continued)

*Primary Examiner* — Scott B Geyer
(74) *Attorney, Agent, or Firm* — Renner, Otto, Boisselle & Sklar, LLP

(57) ABSTRACT

An IR source in the form of a micro-hotplate device including a CMOS metal layer made of at least one layer of embedded on a dielectric membrane supported by a silicon substrate. The device is formed in a CMOS process followed by a back etching step. The IR source also can be in the form of an array of small membranes —closely packed as a result of the use of the deep reactive ion etching technique and having better mechanical stability due to the small size of each membrane while maintaining the same total IR emission level. SOI technology can be used to allow high ambient temperature and allow the integration of a temperature sensor, preferably in the form of a diode or a bipolar transistor right below the IR source.

40 Claims, 16 Drawing Sheets

(56) References Cited

U.S. PATENT DOCUMENTS

| | | | |
|---|---|---|---|
| 6,777,961 B2* | 8/2004 | Hamamoto et al. | 324/703 |
| 7,244,939 B2 | 7/2007 | Stuttard | |
| 7,330,336 B2 | 2/2008 | Luo et al. | |
| 7,511,274 B2* | 3/2009 | Johnson et al. | 250/338.1 |
| 7,541,587 B2 | 6/2009 | Cutler et al. | |
| 8,017,923 B2* | 9/2011 | Inoue et al. | 250/504 R |
| 2006/0154401 A1 | 7/2006 | Gardner et al. | |
| 2007/0102639 A1 | 5/2007 | Cutler et al. | |
| 2008/0239322 A1 | 10/2008 | Hodgkinson et al. | |
| 2008/0272389 A1 | 11/2008 | Rogne et al. | |
| 2008/0308733 A1 | 12/2008 | Doncaster | |

OTHER PUBLICATIONS

Bauer et al., "Design and fabrication of a thermal infrared emitter", Sensors & Actuators A 55 (1996) 57-63.

Yusasa et al., "Single Crystal Silicon Micromachined Pulsed Infrared Light Source", Transducers 1997, (proceedings of IEEE 1998), 0-7803-3829-4.

Cole et al., "Monolithic Two-Dimensional Arrays of Micromachined Microstructures for Infrared Applications", IEEE Sensors 1998.

Hildenbrand et al., "Micromachined Mid-Infrared Emitter for Fast Transient Temperature Operation for Optical Gas Sensing Systems", IEEE Sensor 2008.

Ji et al., "A MEMS IR Thermal Source for NDIR Gas Sensors", IEEE 2006.

Spannhake et al., "High-termperature MEMS Heater Platforms Long-term Performance of Metal and Semiconductor Heater Materials", Sensors 2006, ISSN 1424-8220, pp. 405-419.

Tu et al., "Micromachined, silicon filament light source for spectrophotometric Microsystems", Applied Optics 2002, vol. 42, No. 13, May 1, 2003.

Graf et al., "Review of micromachined thermopiles for infrared detection", Measurement Science and Technology, 18 (2007) R59-R75.

Fordl et al., "A High-Precision NDIR CO2 gas sensor for automotive applications", IEEE Sensors Journal, vol. 6, No. 6, 2006.

Courbat et al. "Reliability improvement of suspended platinum-based micro-heating elements," Sensors and Actuators A 142 (2008) 284-291.

Liew et al, "Electromigration interconnect lifetime under AC and pulse DC Stress", Proceedings of IEEE Reliability Physics Symposion 1989, pp. 215-219.

Maiz, "Characterisation of electromigration under bidirectional and pulsed unidirectional (PDC) currents", Proceedings of IEEE Reliability Physics Symposion 1989, pp. 220-228.

Garcia-Guzman, "Design and simulation of a smart rationmetric ASIC chip for VOC monitoring", Sensors and Actuators B Nov. 2003, 232-243.

Kim et al., "A new uncooled thermal infrared detector using silicon diode", Sensors and Actuators A, 89 (2001) pp. 22-27.

Eminoglu et al., "Low-cost uncooled infrared detectors in CMOS process", Sensors and Actuators A 109 (2003) pp. 102-113.

Barritault et al., "Mid-IR source based on a free-standing microhotplate for autonomous $CO_2$ sensing in indoor applications", Sensors and Actuators A 172 (2011) pp. 379-385.

San et al., "A silicon micromachined infrared emitter based on SOI wafer", Proceedings of SPIE 2008, vol. 6836, 68360N-1.

Weber et al., "Improved design for fast modulating IR sources", J. Micromech. Microeng. 7 (1997) pp. 210-213.

Cole et al., "Monolithic Two-Dimensional Arrays of Micromachined Microstructures for Infrared Applications", Proceedings of the IEEE, Vo. 86, No. 8, Aug. 1998.

* cited by examiner

IR EMITTER AND NDIR SENSOR

RELATIONSHIP TO EARLIER APPLICATIONS

This application is a continuation-in-part of U.S. application Ser. No. 12/691,104 filed on Jan. 21, 2010, which is hereby incorporated by reference in its entirety.

FIELD OF THE INVENTION

This invention relates to a thermal Infra-Red (IR) source using a micro-hotplate fabricated on a microchip. The invention also relates to integrating the IR source with an IR detector to make an NDIR sensor.

BACKGROUND TO THE INVENTION

It is known to fabricate a thermal IR source on a silicon substrate consisting of a micro-heater formed within a thin membrane layer (made of electrically insulating layers) that is formed by etching part of the substrate. Such devices can be used to provide heat (e.g. 600° C.) with low power consumption (typically from a few mW to hundreds of mW) for use as infra-red sources/emitters.

For Example, Parameswaran et. al. "Micro-machined thermal emitter from a commercial CMOS process," IEEE EDL 1991 reports a polysilicon heater for IR applications made in CMOS technology, with a front side etch to suspend the heater and hence reduce power consumption.

Similarly, D. Bauer et. Al. "Design and fabrication of a thermal infrared emitter" Sens & Act A 1996, also describes an IR source using a suspended polysilicon heater although the device is not envisaged to be fabricated in a CMOS process. Moreover, wafer bonding is used to encapsulate the heater in vacuum (which adds extra fabrication steps and increases the manufacturing cost).

Patent U.S. Pat. No. 5,285,131 by Muller et al. and patent US2008/0272389 by Rogne et. al both describe similar devices using a polysilicon heater.

San et. al. "A silicon micromachined infrared emitter based on SOI wafer" (Proc of SPIE 2007) describe an IR emitter fabricated from an SOI substrate using polysilicon as the heater and DRIE to form the membrane.

The use of polysilicon in all these designs reduces the stability of the device as polysilicon resistance drifts in time at high temperatures above 400° C.

Yuasa et. al "Single Crystal Silicon Micromachined Pulsed Infrared Light Source" Transducers 1997, describe an infrared emitter using a suspended boron doped single crystal silicon heater. The paper does not envisage the device to be fabricated within a CMOS process.

Watanabe, in patent EP2056337 describes a suspended silicon filament as an IR source. The device is vacuum sealed by bonding a second substrate. This device is not envisaged to be fabricated in a CMOS process, and the construction of the device also does not lend itself to be fabricated in a CMOS process.

Cole et. al. "Monolithic Two-Dimensional Arrays of Micromachined Microstructures for Infrared Applications" (proc of IEEE 1998) describe an IR source on top of CMOS processed device. These IR sources consist of a suspended micro-heater fabricated after considerable post-CMOS processing. These extra processing steps add to the fabrication cost of the device.

Hildenbrand et. al. "Micromachined Mid-Infrared Emitter for Fast Transient Temperature Operation for Optical Gas Sensing Systems", IEEE Sensor 2008 Conference, reports on a platinum heater on suspended membrane for IR applications. Platinum is however not CMOS compatible and its use in CMOS foundries is prohibited, as it acts as a deep dopant and can contaminate other CMOS process steps.

Similarly Ji et. Al. "A MEMS IR Thermal Source For NDIR Gas Sensors" (IEEE 2006) and Barritault et. al "Mid-IR source based on a free-standing microhotplate for autonomous CO2 sensing in indoor applications" (Sensors & Actuators A 2011) describe a micromachined IR source based on a platinum heater. Weber et. al. "Improved design for fast modulating IR sources" describe suspended as well as closed membrane designs for IR sources, both using a platinum heater and a membrane consisting of Silicon oxide and silicon nitride layers.

Spannhake et. Al. "High-temperature MEMS Heater Platforms: Long-term Performance of Metal and Semiconductor Heater Materials" (Sensors 2006) describes micro-hotplate based on either platinum or antimony doped Tin oxide heaters.

As already mentioned, Platinum is incompatible with CMOS processes and so these devices cannot be fabricated in a CMOS process. This increases the fabrication cost and means that circuitry cannot be fabricated with the device.

Tu et. al, "Micromachined, silicon filament light source for spectrophotometric microsystems" Applied Optics, 2002, presents design of a light source employing single crystal silicon heaters on an SOI membrane. Suspended filaments however, have less mechanical stability than a full membrane.

U.S. Pat. No. 6,297,511 by Syllaios et. al. describes an IR emitter made on a suspended membrane with a resistive heater which can be of various materials such as titanium, tungsten, nickel, single crystal silicon or polysilicon. U.S. Pat. Nos. 5,500,569, 5,644,676, 5,827,438 by Bloomberg et. al. report on IR sources with either polysilicon or metal (such as tungsten, tantalum, titanium-tungsten alloy, molybdenum) heaters. However, these devices are not envisaged to be fabricated using a CMOS process.

WO 02/080620 A1 by Pollien et. al. suggests using metal silicides as the heater material in micro-hotplates. The silicide is mentioned as having a polycrystalline structure from silicides of tantalum, zirconium, tungsten, molybdenum, niobium and hafnium. The possible use of such devices as IR sources is mentioned. However metal silicides are not standard materials used in commercial CMOS processes. Advantages of manufacturing the micro-hotplates by a standard CMOS process are given, however no mention is made of how this can be achieved given that metal silicides is not a material found in CMOS processes. In addition no mention of a CMOS process is made in the claims of the patent.

It is also known to fabricate IR detectors in silicon technology. Kim et. al. "A new uncooled thermal infrared detector using silicon diode" Sens & Act A 89 (2001) 22-27 describes a diode for use as an IR detector. U.S. Pat. No. 6,597,051 describes a thermopile fabricated by micromachining for use as an IR detector. Eminoglu et. al. "Low-cost uncooled infrared detectors in CMOS process" describes an IR detector using diodes on a microbridge membrane fabricated in a CMOS process Sens & Act A 109 (2003) 102-113. A. Graf et. al. "Review of micromachined thermopilers for infrared detection," Meas. Sci. Technol. 18(2007) R59-R75) describes various thermopile based micro-machined IR detectors reported in literature. It is also known to make NDIR sensors, for example Fordl and Tille "A High-Precision NDIR CO2 gas sensor for automotive applications" IEEE Sensors Journal vol 6 No.6 2006, and patent US2007/0102639 by Cutler et. al describe typical NDIR sensors consisting of a filament bulb as an IR source, and a thermopile based IR detector. The two are placed at the opposite ends of a small chamber where gas can enter through a semi permeable membrane (which blocks dust and IR radiation from outside). Depending on the concentration of the target gas, the amount of IR emission of a particular wavelength is absorbed within the optical path, and using the measurement from the IR detector can be used to determine the gas concentration. Most NDIR sensors also have an optical filter to allow only a small range of wavelengths to reach the IR detector so as to make it specific for the gas that absorbs that wavelength.

Other patents, such as US2008/0239322 by Hodgkinson et. al., U.S. Pat. No. 7,244,939 by Stuttard et. al, US2008/0308733 by Doncaster et. al., and U.S. Pat. No. 7,541,587 by Cutler et al. describe similar devices.

In almost every case, the IR emitter and detector are two different components but packaged together. An exception is U.S. Pat. No. 5,834,777 by Wong, where both the emitter and detector are on the same chip with an optical path made on the chip. However in this case, because the optical path is on the chip, it is a very small distance for the IR emission to travel, and so the sensor has a low sensitivity.

STATEMENT OF THE INVENTION

In accordance with one aspect of the present invention there is provided an IR source comprising a resistive heater made from a CMOS metal on a dielectric membrane fabricated in a CMOS process followed by a back etch. The CMOS metal may comprise at least one layer of tungsten.

According to one embodiment of the present invention, there is provided a micro-hotplate fabricated using a CMOS process. The process starts with a simple silicon wafer, or an SOI wafer which is processed using a standard commercial CMOS or SOI process that uses tungsten as an interconnect material for electronic devices. The tungsten interconnect metal is used to form the micro-heater for the device. A Ti/TiN liner is used to improve the stability of the metal. The CMOS processing step is followed by a back etching step to form the membrane. This step can be either dry etching by DRIE or wet anisotropic etching such as KOH or TMAH.

The membrane or the heater can be either circular or rectangular shaped, the circular shape having an additional advantage of reducing the mechanical stress. The heater can be of any shape such as meander, spiral, ring, multiple rings etc. The device may also consist of one or more metal heat spreading plates above the heater. The device may also have a metal heat spreading plate formed from the top metal layer which is then exposed by removing the passivation. A silicon heat spreading plate may also be fabricated just below the heater to improve the temperature uniformity. This can be formed either using the active silicon layer in an SOI process, or for a bulk process by doping the silicon region during before bulk etching to leave a silicon island unetched during the back etch. Alternately, a diode (i.e. thermodiode), or a thermotransistor (npn or pnp with one junction shorted), or a resistive track of silicon maybe be formed below the heater (or adjacent to the heater) instead of the heat spreading plate, and can act as a temperature sensor. The device may also have a resistive temperature sensor formed from one of the metal layers. The heater itself can also be used as a temperature sensor—in which case two extra tracks can optionally be connected to the heater to improve the resistance measurement using a 4-wire measurement.

In another embodiment of the invention, the IR source consists of an array of several membranes etched by DRIE packed together, each with its own micro-heater made from tungsten. This improves redundancy in case one of the devices fails. Another use of the array is to compensate for drift. For example, in an array of two, only one maybe used regularly, and the other one turned on only occasionally to calibrate the drift of the main heater. Alternately, two or more micro-hotplates can be driven in a cycle so that only one is on at any given time, and so increase the overall lifetime of the device.

Another use of the array is to have an array of smaller membranes instead of one large membrane. A large membrane is mechanically less stable compared to a small membrane, but a small membrane device will have lower IR emissions. By using an array of small membranes, the mechanical stability of a small membrane can be achieved while having high levels of IR emission. The use of DRIE to etch the membranes means that the membranes can be packed very close together and very little extra space on the chip is required when compared to a single large membrane. The micro-heaters can be electrically connected either so that they are driven together at the same time, or driven individually.

The micro-hotplates in the array can also be driven independently at different temperatures. This results in a broader spectrum of IR emission, and when used in an NDIR gas sensor system, can help improve the selectivity if a number of detectors are used. Alternately, the optics in the NDIR system can be designed so that the emission through each emitter in the array passes through a different IR filter and onto different detectors. This allows the capability of sensing more than one gas using a single NDIR sensor.

In another embodiment of the invention the micro-hotplate is covered with a coating to improve the IR emission. This coating can be of any type, such as carefully controlled layers of silicon oxide, silicon nitride or polymers (e.g. polyimide). Alternately materials such as carbon black, carbon nanotubes, metal oxides or graphene can be grown or deposited on the micro-hotplate. These materials have high emissivity and therefore improve the amount of IR emitted. Other materials having high emissivity can also be used. Such materials can be deposited post-CMOS onto the heating area of the micro-hotplate via techniques similar to inkjet or nano depositions or can be grown via CVD across the entire wafer or only locally using the micro-hotplate as the source of heat during growth. Several micro-hotplates can be connected together across the silicon wafer to facilitate local growth.

In another embodiment of the invention, an IR filter is combined with the IR source. This is by using back etching to form a thin membrane consisting of silicon dioxide and/or silicon nitride on a silicon or SOI chip or wafer. This membrane can act as an IR filter. This chip/wafer is then combined with the IR source by the use of wafer bonding. The composition of the membrane acting as the filter can be changed and other materials can be deposited on the membrane to change the filtering properties as desired.

Alternatively the filter can be made by etching selectively the CMOS metal layers above the silicon in a mesh shape or as dots. The mesh size or the size of the dots and the distance between the dots are adjusted to filter the desired emission at particular wavelengths and/or to increase the emission at particular wavelengths. The etching of the metal layers above the silicon may be done in the CMOS sequence, and therefore does not come with additional cost.

This method can be combined with arrays by using an array of filters wafer bonded onto an array of IR source. Each filter can have either the same properties, or different properties to allow a different spectrum of wavelengths.

Another important aspect is the packaging of the micro-hotplates. Any standard packaging such as TO-5, TO-39 or TO-46 can be used or they can be placed directly onto a PCB board, however the lids should be open to have a cavity to allow the emission of IR. In addition, the packaging can be done with IR reflecting surfaces below the chip as well as on the sides of the chip to improve the direction of the emission. The packaging may also include a filter in addition to, or in place of the filter waferbonded to the IR source or that made of the CMOS metal layer.

It can also be packaged directly in an NDIR chamber. Another possible packaging method is by flip chip, where a bump bond is applied to the bond pads, and the chip is packaged upside down on a PCB or on a package. An advantage of this method is that the IR is emitted through the trench, and the side walls of the trench act as a reflector. This makes the beam more directional. A reflecting material maybe deposited onto the trench sidewalls to improve their reflectivity. Alternatively the back-etch can be controlled using various wet and dry techniques to shape the walls of the trench to enhance the reflectivity. Additional metal layers within the membrane and the back plate of the packaging surface also act as reflectors.

Because according to this invention the IR source is made in a CMOS process, circuitry can be integrated on the same chip with the IR source. This can include the drive circuitry for the heater, circuitry for the temperature sensor, as well as a temperature controller circuit and other complex circuitry. The drive circuitry can be made to modulate the IR source and drive it at various frequencies. For example a very simple circuit could be made of only one MOSFET placed in series with the heater. By applying a controlled potential on the gate of the MOSFET, the heater can be switched on and off. The pulse width and the amplitude of the pulse on the gate control the temperature of the micro-hotplate.

In another embodiment of the invention, an IR detector is integrated on the same chip as the IR source. The IR detector consists of either a thermopile or an array of thermodiodes or thermotransistors on a membrane. If the detector is a thermopile it can consist of one or more thermocouples connected in series with one junction inside the membrane and one outside. The two thermocouple materials may consist of p or n doped single crystal silicon, n or p doped polysilicon or a metal (such as tungsten). If thermodiodes are used they may consist of a P+/N+ junction, or may have a p or n type well or drift region between. The diodes can be connected as an array to improve the sensitivity. Thermodiodes in particular have the advantage that their temperature coefficient is constant for high temperatures up to 500° C. Circuitry can be integrated on-chip to process the detector signal. Similarly thermotransistors are made in CMOS technology using bipolar npn or pnp structures with at least one junction shorted. The thermodiode or thermotransistors or circuits based on these are preferable, as the process control of active elements in CMOS such as diodes and transistors is better than that of passive elements such as resistors.

To improve the performance, the IR detector may also have an IR absorbing material such as carbon nanotubes, carbon black, graphene, polyimide, a polymer, metal films, metal blacks, thin film stacks or other materials with high IR absorption deposited on the top of the membrane. The IR absorbing layer should be carried out post-CMOS and can be formed by CVD, local growth or ink-jet deposition techniques.

Alternatively the IR absorption of the integrated IR detector can be increased by etching selectively the CMOS metal layers above the silicon in a mesh shape or as dots. The mesh size or the size of the dots and the distance of the dots are adjusted to increase the optical signal at a particular wavelength and/or to filter out signal at other wavelengths. The etching of the metal layers above the silicon is done in the CMOS sequence, and therefore does not come with additional cost.

The chip may be packaged to be used as an NDIR sensor within a package such that there is a partition between the two devices and the IR emission cannot travel directly from the source to the detector. Instead, the IR emission has to travel a much longer path to reach the source via an IR filter. This is achieved during both chip and package design. When designing the chip, the dielectric oxide between the emitter and detector is filled with vias and metal layers to block the transmission of IR within the dielectric oxide. After this a partition is formed above the chip which can be done during packaging, or earlier by wafer bonding with a patterned substrate on top. Complex circuitry can be integrated on the chip for drive and signal processing of both the IR source and detector on the chip.

The packaging to form such a sensor can be of different types. One embodiment of the invention is to package the chip in a cylindrical package with walls made from a reflective surface with a filled centre, so that the IR radiation travels in a circular path (reflecting from the package walls) from the emitter to the detector part of the chip. The optical path also has an optical filter to allow only the wavelength of interest to reach the IR detector. The package is covered with a particle filter to prevent air borne particles from coming in the optical path.

Another embodiment is for the package to be rectangular with the chip on one side, and a reflective surface on the far side of the package allowing reflected IR to travel from the source to the detector.

BRIEF DESCRIPTION OF THE DRAWINGS

In order that the invention may be more fully understood, a number of embodiments of the invention will now be described, by way of example, with reference to the accompanying drawings, in which.

DETAILED DESCRIPTION OF THE PREFERRED EMBODIMENTS

Figure 1:
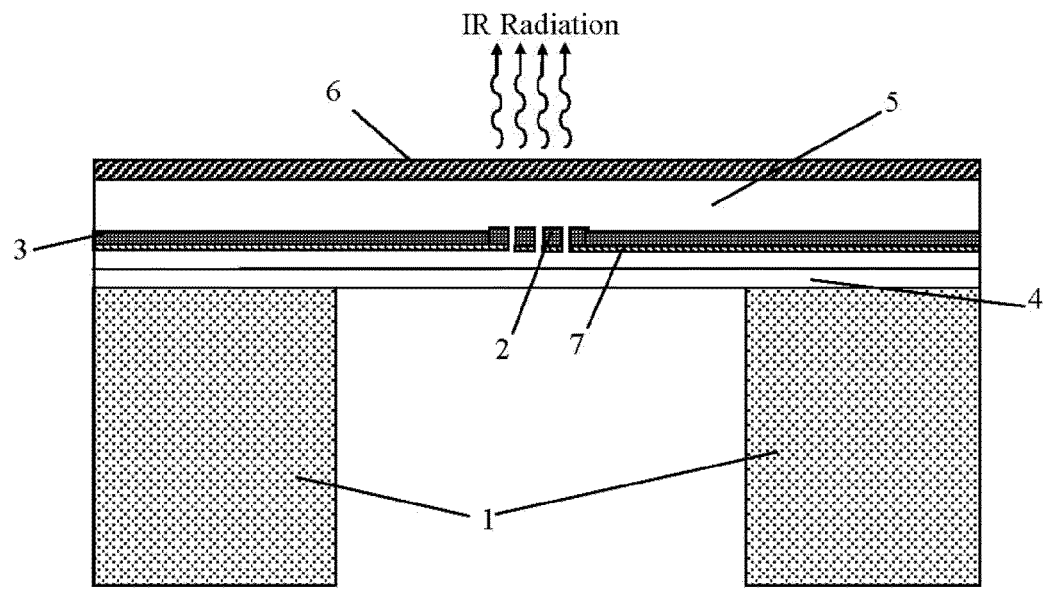
FIGS. 1 to 8 are schematic cross-sections of different designs of a CMOS IR emitter.

Embodiments of the present invention seek to improve on the state of the art devices by using a CMOS layer of tungsten both as part of a heater which emits infrared radiation and an interconnect metal for electronic devices. The IR emitter is embedded into a dielectric membrane defined by etching the silicon substrate. The etching may be done by a Deep Reactive Ion (DRIE) technique. Such a device can operate reliably at high temperatures (well above 600° C.) due to the use of the tungsten heater. Moreover the use of the tungsten layer within a CMOS process ensures very high stability, long term reliability and high reproducibility. This is in contrast to heaters fabricated by other techniques than CMOS such as screen printing. To further improve the reliability, the tungsten heater may have a titanium/titanium nitride liner. Furthermore, the use of the CMOS technology to fabricate the device results in lower fabrication costs and allows circuitry to be integrated on the same chip as the device.

In another embodiment of the invention, the device can be made as an array of micro-hotplates, consisting of either same size or smaller membranes packed together closely, each with its own heater. Using several small membranes instead of a large one results in better mechanical stability for each membrane without compromising the IR emission. Arrays also add redundancy to the design in case one device fails. Packing such membranes close together is achieved by the use of DRIE which allows vertical sidewalls between the membranes.

Another embodiment of the invention is to integrate an IR detector on the same chip as the IR source, to use the chip in an NDIR (Non dispersive InfraRed) gas sensor. Fabricating the IR emitter and detector on the same chip can ensure that the IR emitter and detector have similar thermal mass and therefore similar speed. Moreover, the noise of the system is reduced. Furthermore, as a result of integration, and the use of the CMOS process, the NDIR chip can be made significantly cheaper.

The IR source and detector may be on the same chip with a partition in between, and packaged in such a way so as to that there is a relatively long optical path for the IR emission to travel from the emitter to the detector. An IR filter may be packaged between the path so that only the wavelength of interest reaches the detector. This wavelength is absorbed by the target gas, and hence the signal at the detector can be used to determine the gas concentration.

The CMOS process in all embodiments may be applied to Silicon-on-Insulator (SOI) substrates. SOI technology is widely used in high voltage, high temperature and high frequency electronics. The SOI may be used for three purposes:

1) To provide a region of silicon under the heater to integrate a thermodiode or a thermotransistor as a temperature sensor. This can be directly under the heater or adjacent to the heater. The thermodiode or the thermotransistor can be small in area to maintain low leakage, essential for operating at high temperatures (e.g. 600 C). Using the thermodiode or the thermotransistor the IR emitter temperature can be monitored with high accuracy 2) To allow the ambient temperature to reach 225 C. This is a result of both the SOI technology which results in low leakage currents and no latch-up and the use of tungsten metallization 3) To use the buried oxide present in the SOI substrates as an effective etch stop during the back-etching.

FIG. 1 shows a schematic cross section of an IR source made in a SOI-CMOS process. There is provided a membrane layer 4,5,6 which is supported on a silicon substrate 1, the membrane layer consists of the buried oxide layer 4, dielectric layers 5 and a passivation layer 6. A tungsten resistive heater 2 is formed within the membrane layer and connected to the rest of a chip by tracks 3. The resistive heater 2 may be of any shape, for example, meander, spiral or ring-shaped, or may consist of multiple rings. The tungsten layer has a thin titanium/titanium liner 7 to improve the reliability of the heater.

The entire micro-hotplate is manufactured by using a commercial SOI process. Optionally, the membrane layer is formed in this case by the use of back etching using deep reactive ion etching (DRIE) technique. The micro-hotplate can be fabricated with or without circuitry on the same chip.

Figure 2:
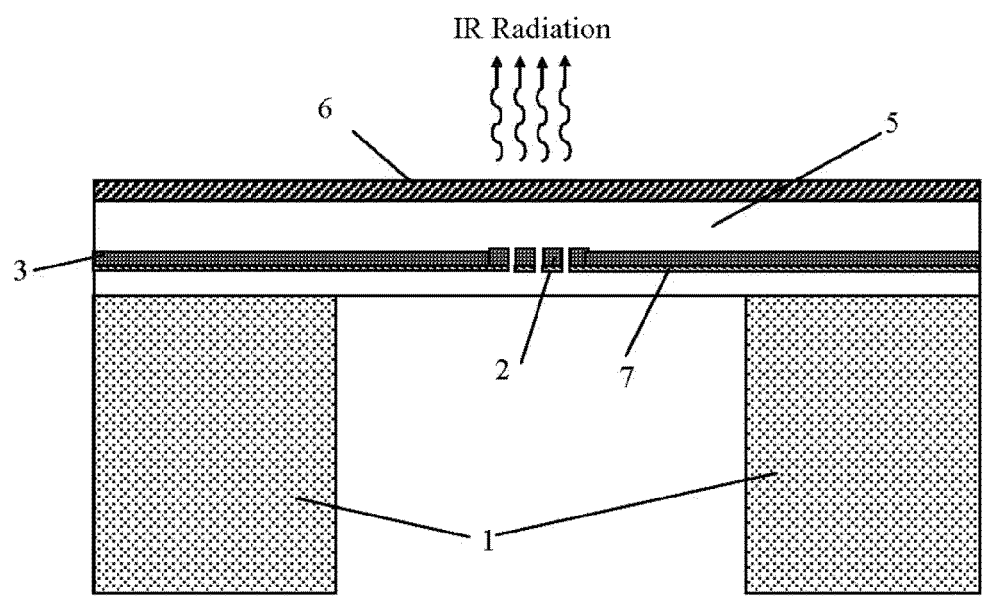

FIG. 2 shows another cross-section of a micro-hotplate used as an IR emitter, fabricated in bulk CMOS process. The device is similar to that in FIG. 1, except that the buried oxide layer 4 is absent.

Figure 3:
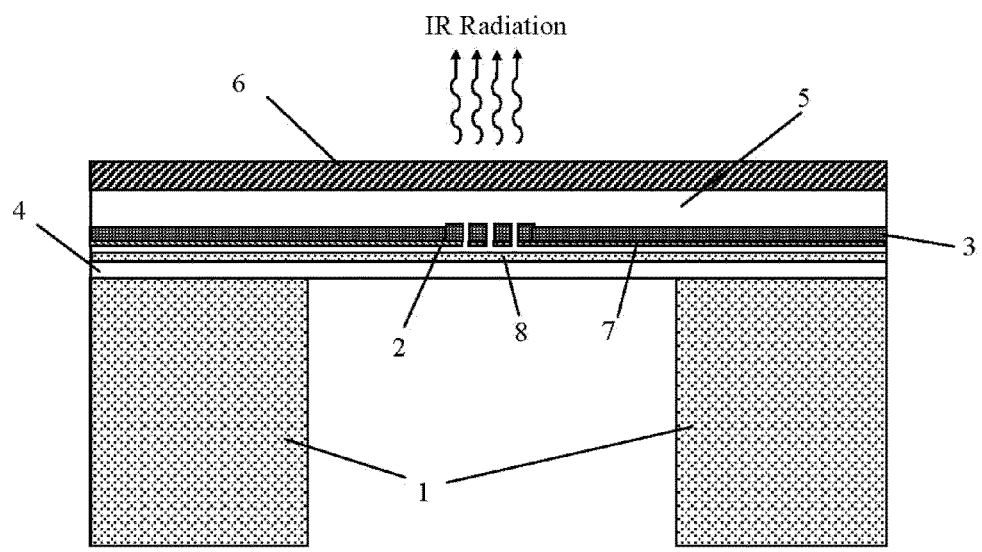

FIG. 3 shows the cross-section of an IR emitter where the membrane layers also include a thin silicon layer 8 to improve the robustness of the membrane.

Figure 4:
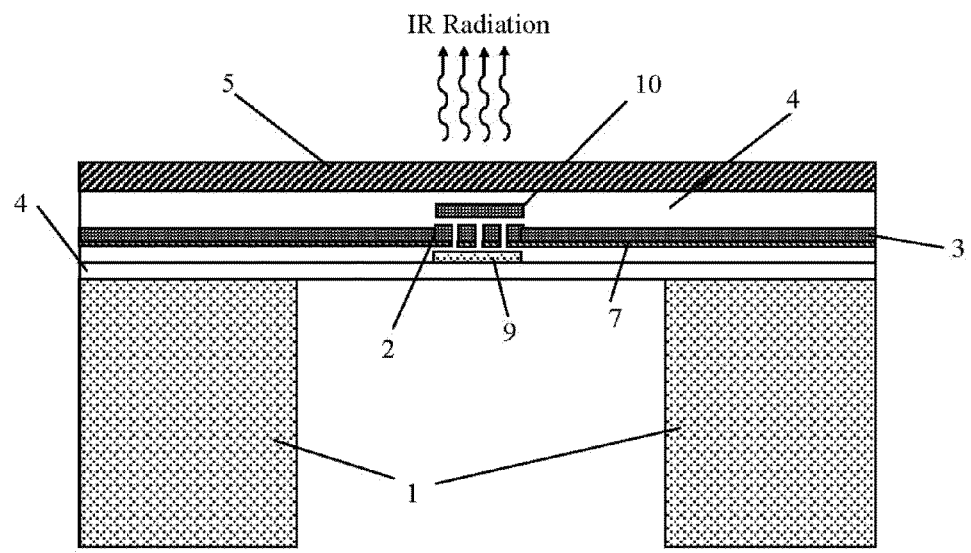

FIG. 4 shows the cross-section of an IR emitter having a thin silicon plate 9 directly below the heater and a thin metal plate 10 directly above the heater so as to spread heat. The purpose of these is to improve the temperature uniformity. While this figure shows one particular arrangement of these plates, it can be easily seen that different arrangements can be done. For example there can be two metal plates above the heater, or metal plates above or below the heater, or the silicon plate can be on the underside of the membrane (in bulk CMOS process for example) instead of being embedded within the membrane.

Figure 5:
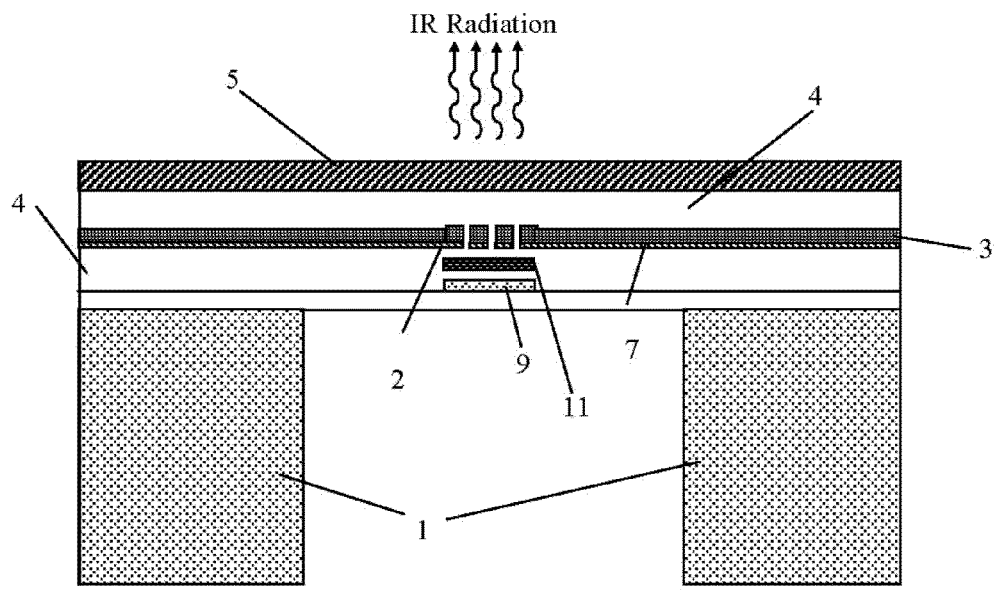

FIG. 5 shows a cross-section of an IR emitter with a single crystal silicon plate as well as a polysilicon plate 11 below the heater. Both plates are as wide as the heater, and the purpose is to reflect the IR radiation from the heater to the front side, which would otherwise be wasted on the back side of the chip. In this way the efficiency of the IR emitter is improved.

Figure 6:
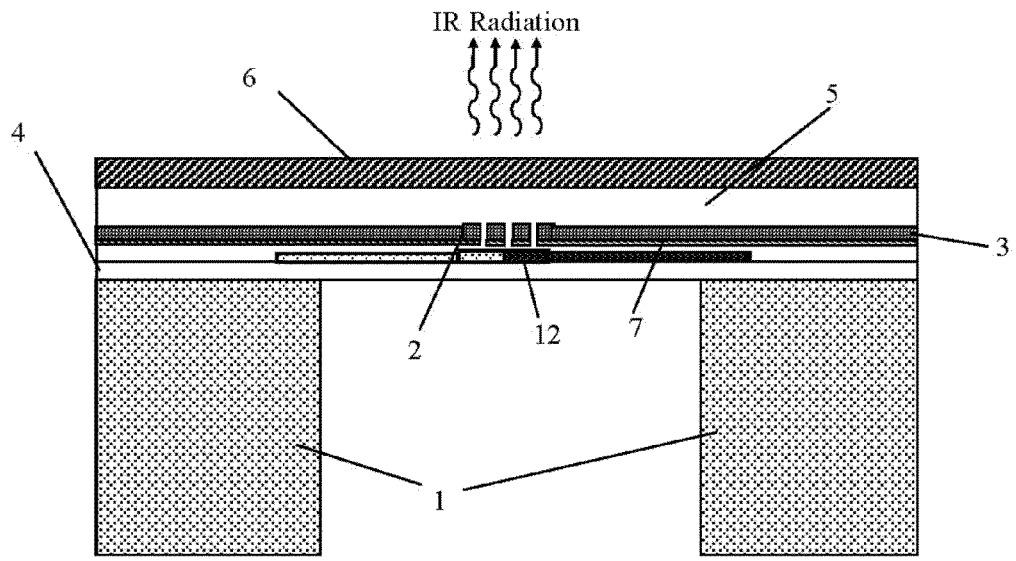

FIG. 6 shows a cross-section of an IR emitter with a diode temperature sensor 12 embedded within the membrane. The diode is as wide as the heater, and acts not only as a diode, but also tends to reflect the IR emission from the heater to the front of the chip. Note that the diode can also be made smaller than the heater, but in this case, it will primarily act as a temperature sensor and will not be as efficient in reflecting the IR radiation.

Figure 7:
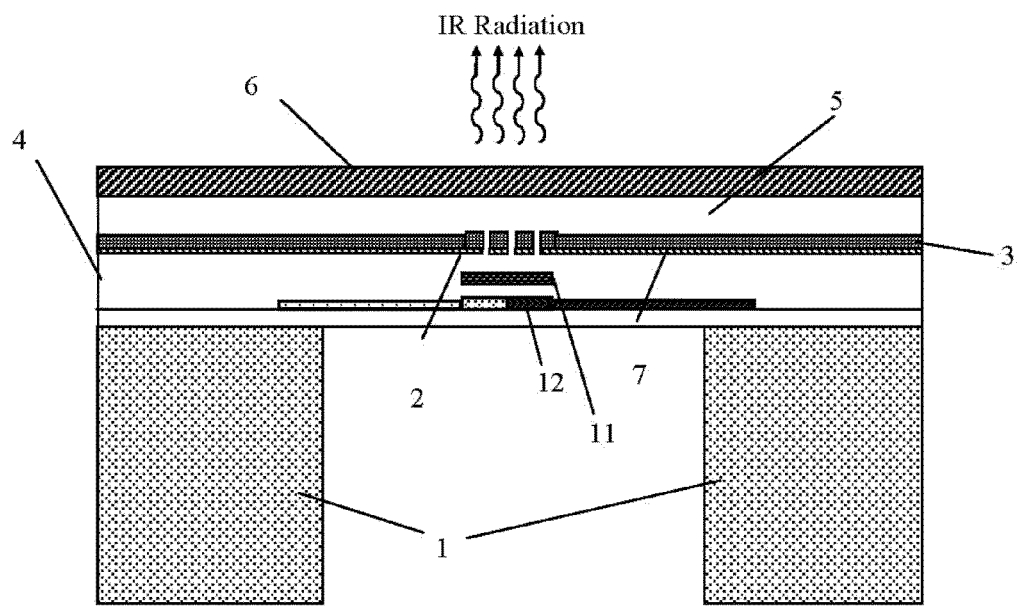

FIG. 7 shows a cross-section of an IR emitter with a diode temperature sensor and a polysilicon plate 11 below the heater, both having the same width as the heater. Both of them act as a reflector for the IR radiation, while the diode also acts as a temperature sensor.

Figure 8:
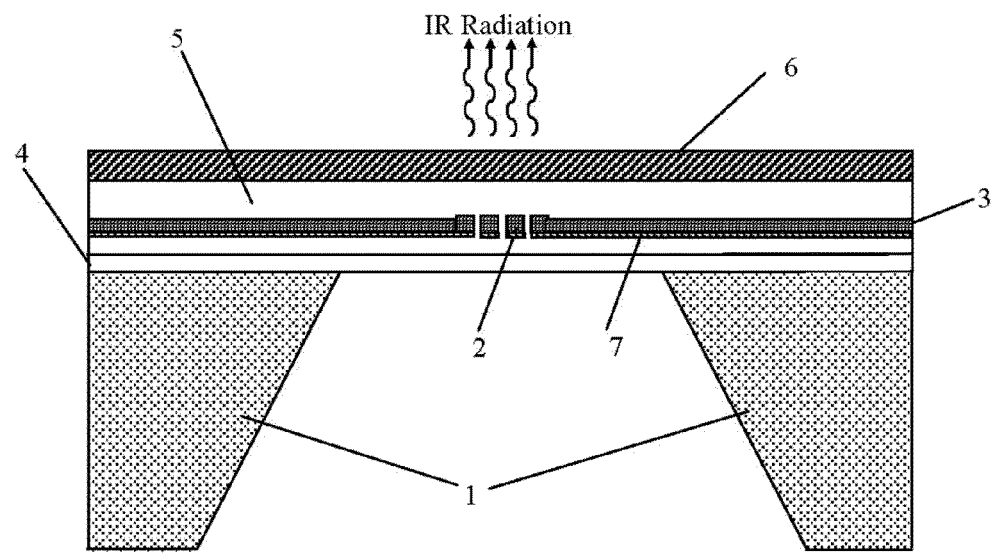

FIG. 8 shows another cross-section of an IR emitter where the membrane has been formed by wet etching, optionally by an anisotropic KOH or TMAH back-etch.

Figure 9:
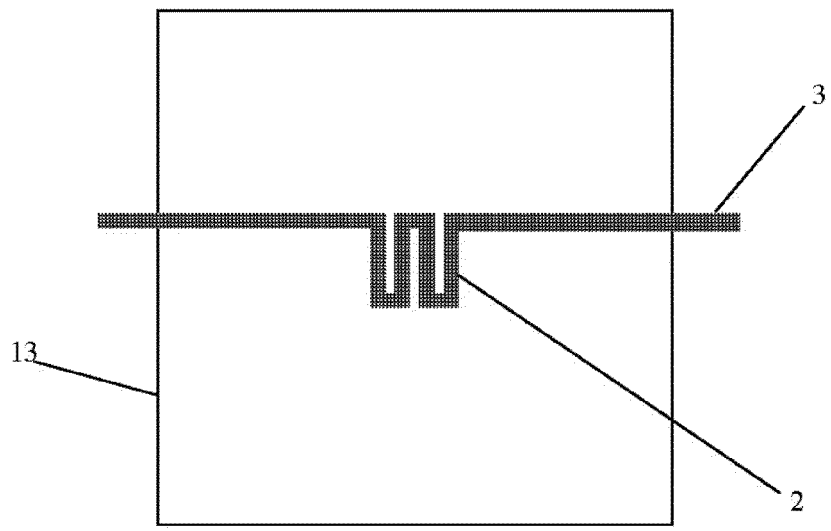
FIGS. 9-12 are plan views of an IR source.
Figure 10:
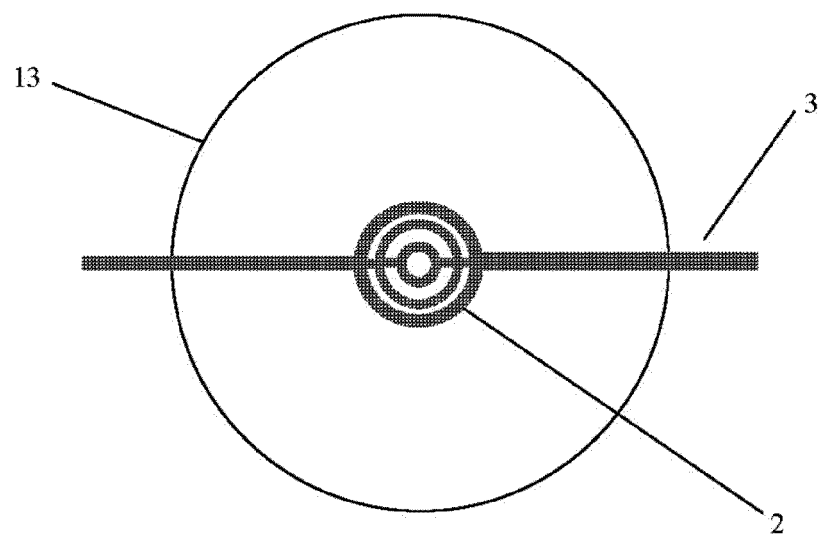

FIG. 9 shows a plan view of a rectangular (in this case square) shaped micro-hotplate IR emitter with a meander heater 2 on a square membrane 13 with metal tracks 3. FIG. 10 is a plan view of a circular micro-hotplate 2 on a circular membrane 13.

Figure 11:
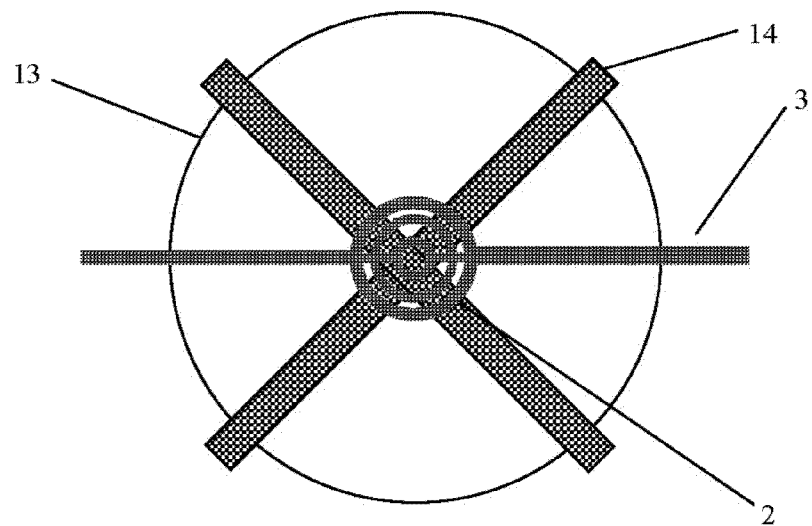
Figure 12:
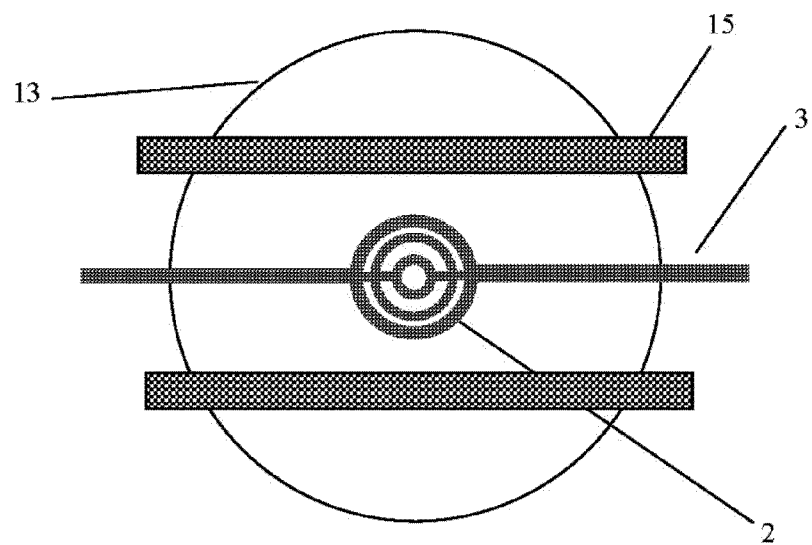

FIG. 11 shows a circular IR emitter with reinforcing silicon beams 14 to improve the mechanical stability of the membrane formed from the thin silicon layer in the starting SOI substrate. FIG. 12 shows another pattern of silicon beams 15 to improve the membrane stability. While these are given as examples, it can be easily seen that other arrangements and structures within the silicon layers can be used to improve the stability. In addition, the metal layers above the heater can also be made into such structures to improve membrane stability.

Figure 13:
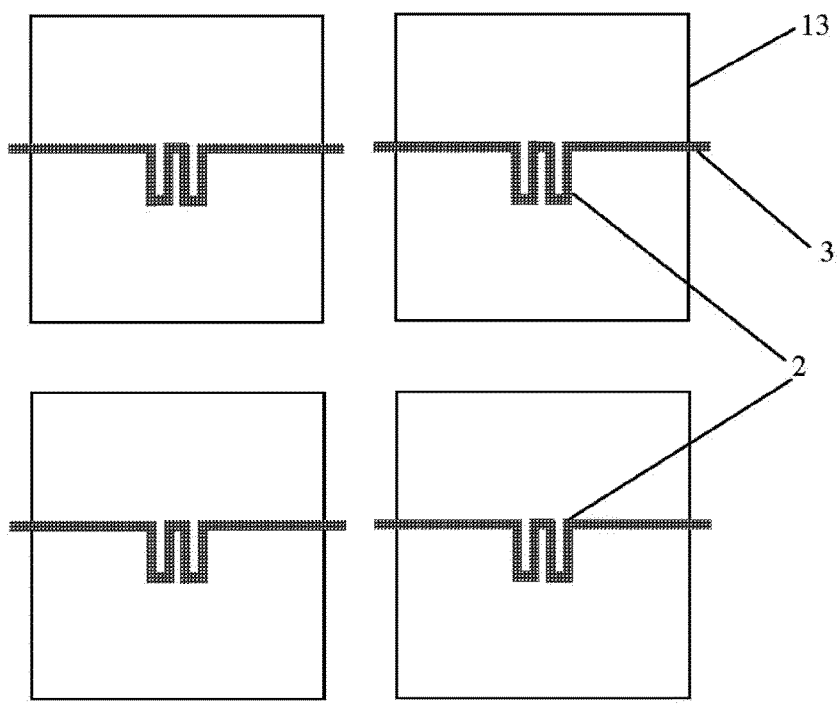
FIGS. 13, 14 are plan views of an IR source consisting of a 2×2 array of membranes.
Figure 14:
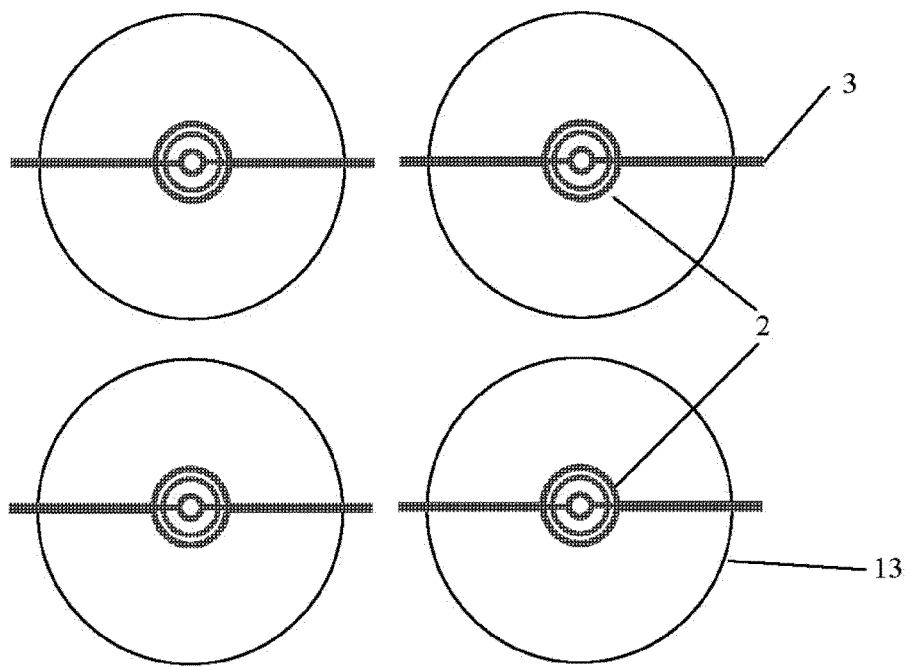

FIG. 13 shows a plan view of an array of micro-hotplates to be used as an IR source. For the same output power, an array of smaller micro-hotplates will be more mechanically stable than a single larger micro-hotplate. The membranes for this array are formed by DRIE to allow the membranes to be packed close together. FIG. 14 is the plan view of an array of circular micro-hotplates.

Figure 15:
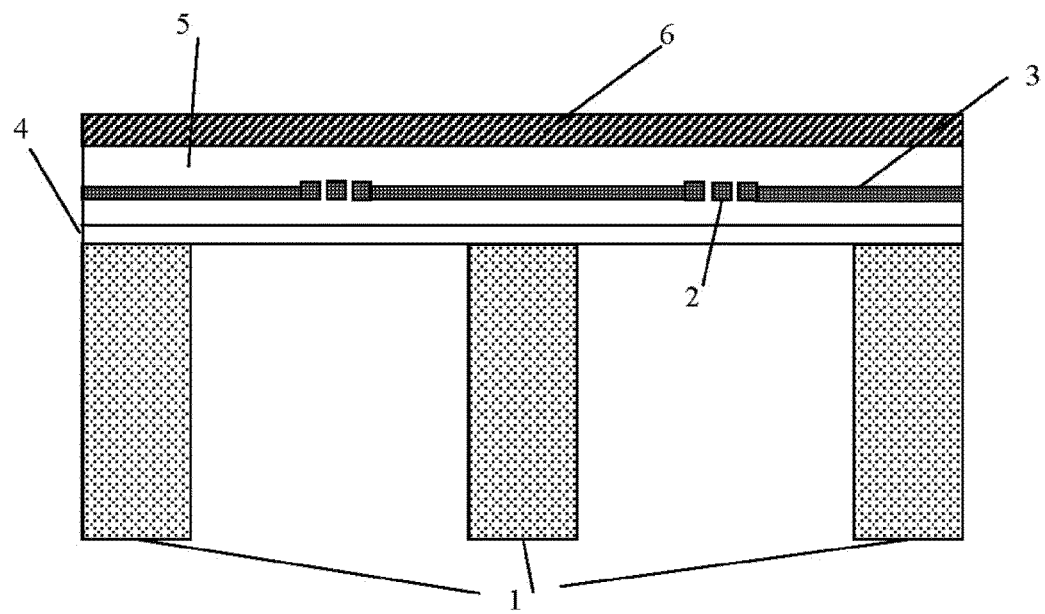
FIG. 15 shows a schematic cross-section of an array device.
Figure 16:
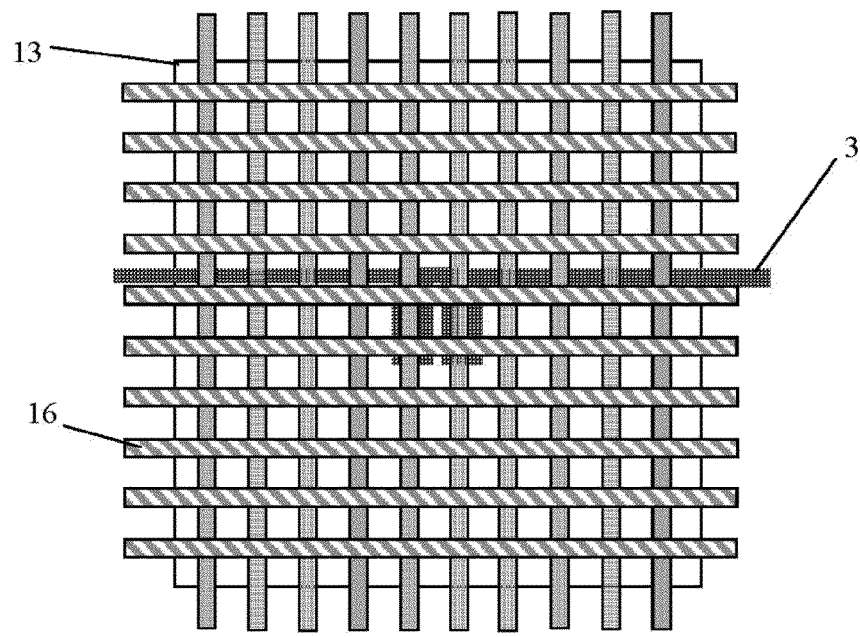
FIGS. 16, 17 are plan views of an IR source with a patterned top metal to improve emission for a particular wavelength.

FIG. 15 shows a schematic cross-section of two of the micro-hotplates of an array close to each other. The near vertical sidewalls obtained due to DRIE etching allow close packing of the membranes FIG. 16 shows a plan view of an IR source with a top metal 16 patterned as a grid. The pattern is made so as to act as a filter or to improve the emission for a particular wavelength.

Figure 17:
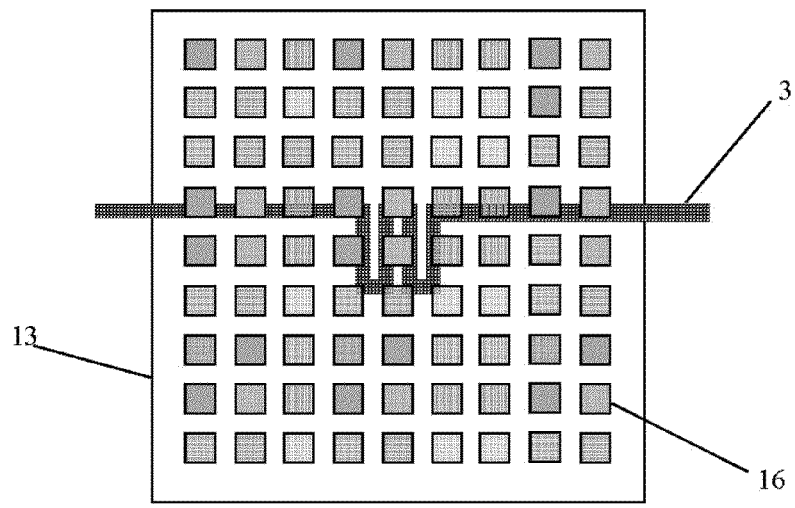

FIG. 17 shows a plan view of an IR source with a top metal 16 patterned as an array of dots to improve the emission of a particular wavelength.

Figure 18:
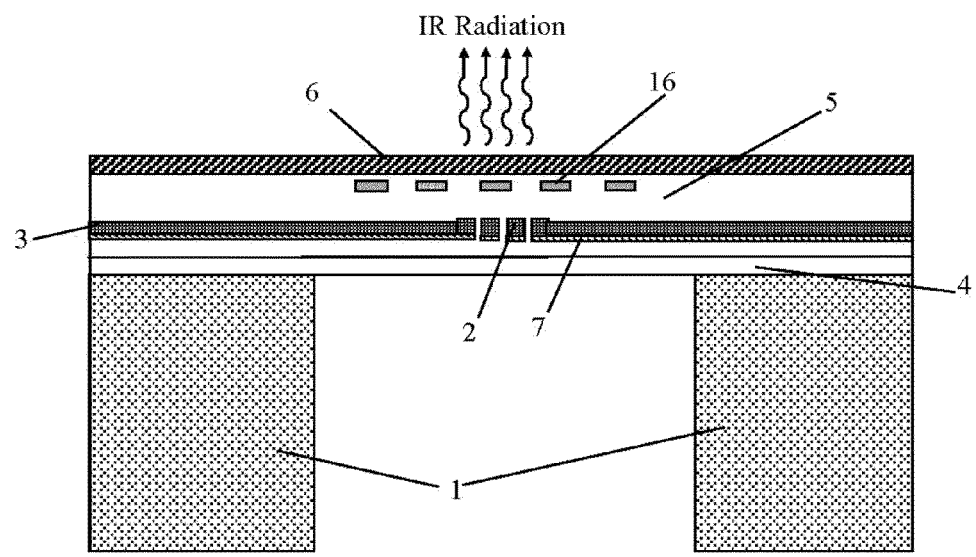
FIGS. 18-20 are cross-sections of an IR source with a patterned top metal to improve emission for a particular wavelength.

FIG. 18 shows a cross-section view of an IR source with a top metal 16 patterned to act as a filter or to improve the emission for a particular wavelength.

Figure 19:
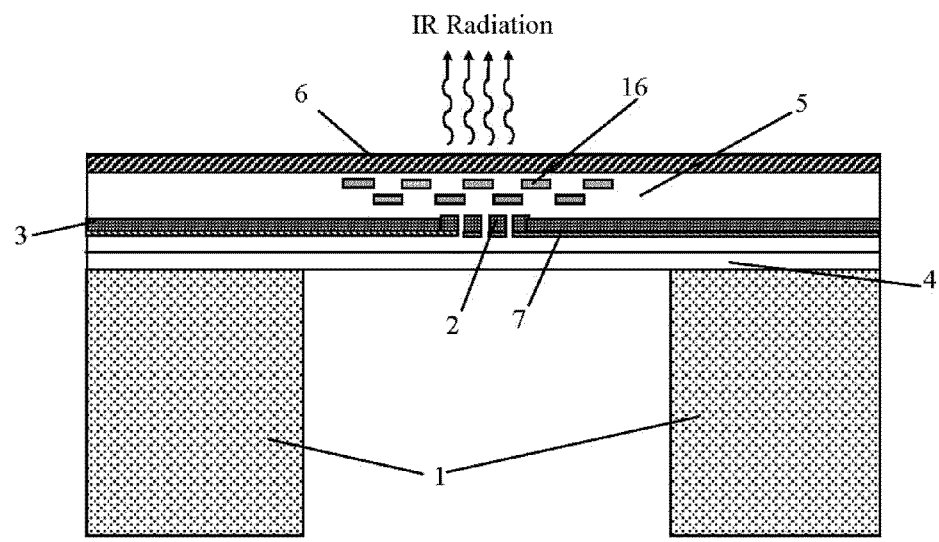

FIG. 19 shows a cross-section of an IR source having two patterned top metals 16.

Figure 20:
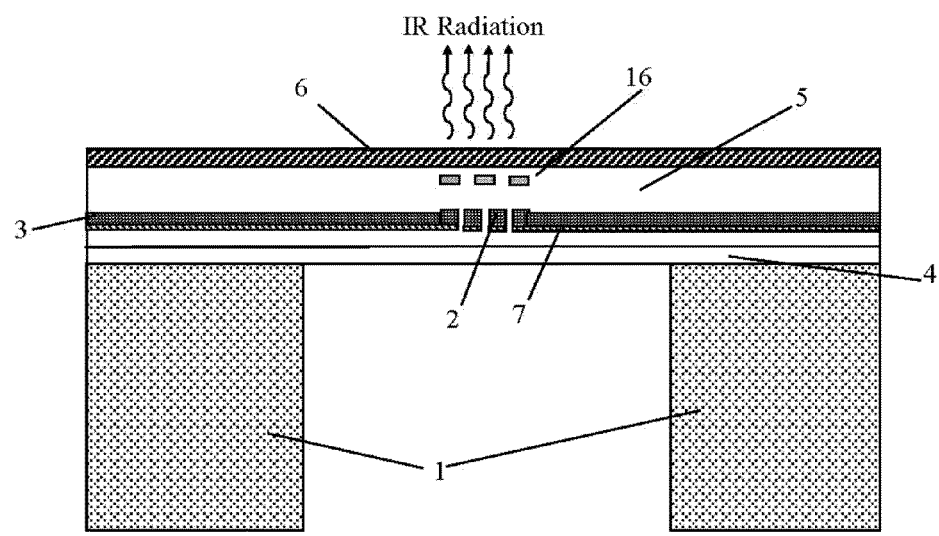

FIG. 20 shows a cross-section of an IR source with a patterned top metal 16 for improving IR emission only within the heater area instead of the whole membrane.

The drawings shown in FIGS. 16-20 for the patterned metal layer 16 to improve emission are given as examples, and it would be evident that other possible patterns and schemes can be used, such hexagonal or circular shapes for example.

Figure 21:
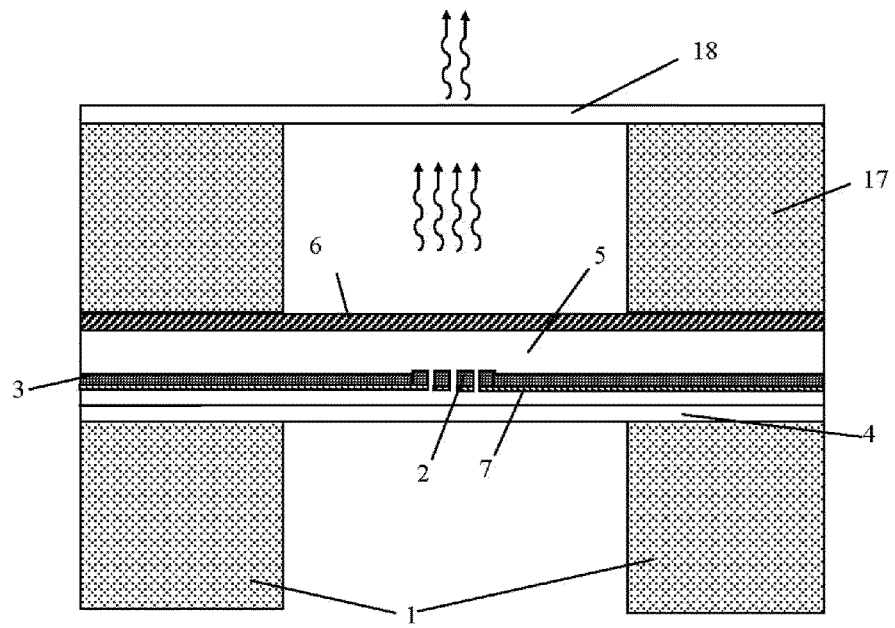
FIG. 21 shows a schematic cross-section of an IR source with a wafer bonded IR filter.

FIG. 21 shows a schematic cross-section of an IR source with a wafer bonded IR filter. The chip/wafer bonded consists of a silicon substrate 17, and a membrane 18. The membrane may consist of silicon dioxide, silicon nitride and/or other materials to alter the filter properties as required.

Figure 22:
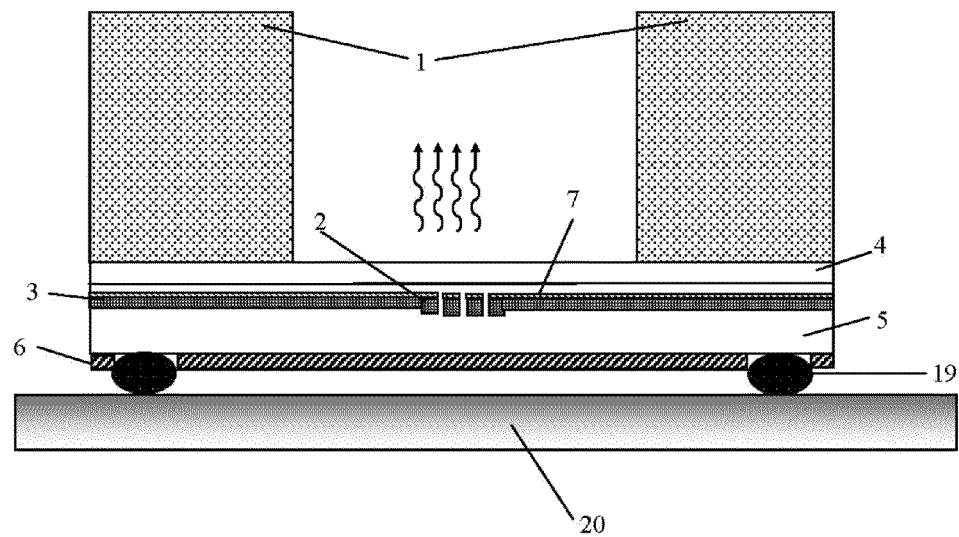
FIG. 22 shows a schematic cross-section of a chip with an IR source packaged in a flip-chip method.

FIG. 22 shows a schematic cross-section of an IR source packaged in a flip-chip method. The flip chip is mounted upside down on the package base 20, and electrically connected through bump bonds 19.

Figure 23:
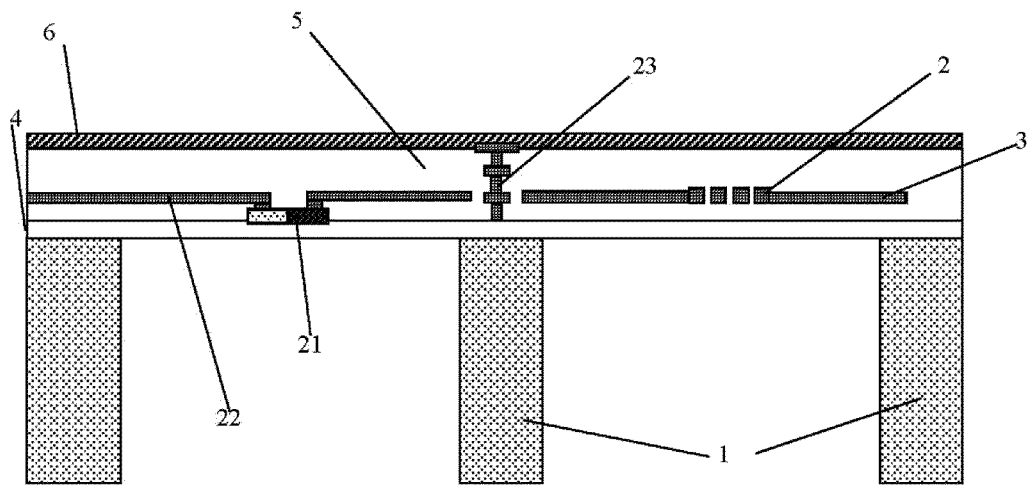
FIG. 23 shows a schematic cross-section of a chip with an IR source and an IR detector integrated on the same chip with partitions in between to prevent direct IR radiation between the two devices.

FIG. 23 shows a schematic cross-section of a chip with an IR source and a diode based IR detector. The IR detector consists of a diode 21 and its connecting tracks 22. The diode is on a membrane similar to the membrane of the IR source. The chip is designed so that the emission from the IR source does not go directly to the IR detector. This is achieved by creating an isolation between the two through a stack of metal layers and vias 23 which are formed by the CMOS process parameters and prevent IR from travelling via the interdielectric layers.

Figure 24:
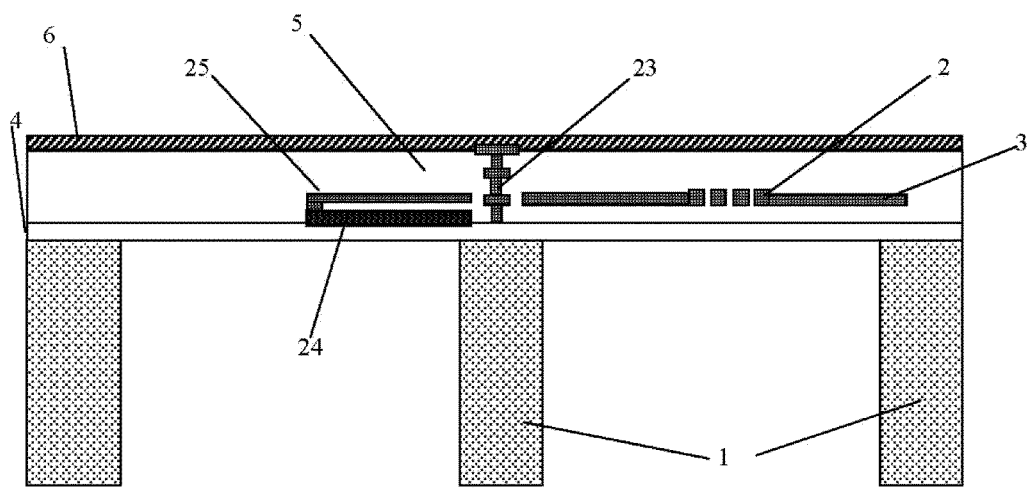
FIG. 24 shoes a schematic cross-section of a chip with and IR source and a thermopile IR detector integrated on the same chip.

FIG. 24 shows a schematic cross-section of a chip with an IR source and a Thermopile IR detector. The thermopile shown in this case is a thermocouple consisting of a p-doped silicon track 24, and a tungsten track 25. However it should be noted that these two materials are given as an example and other materials available in the process such as polysilicon and n-doped silicon can also be used.

Figure 25:
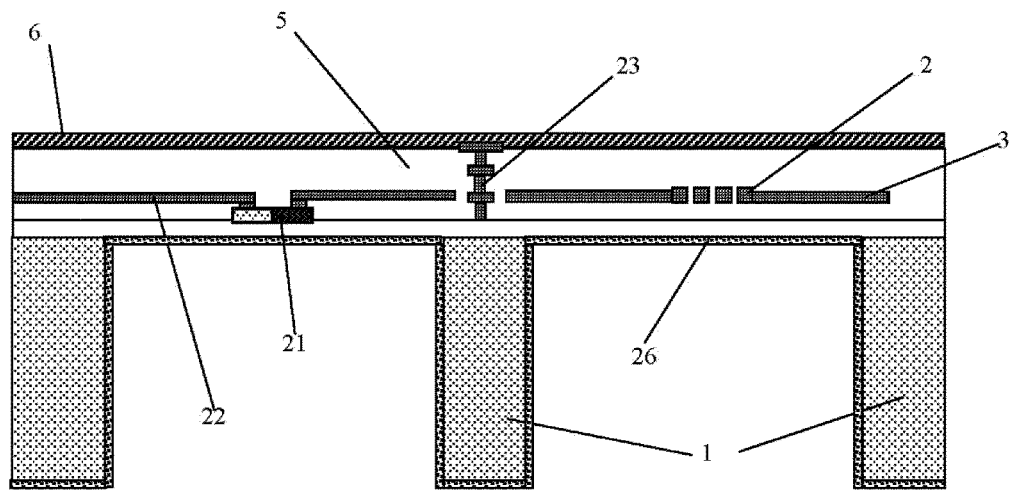
FIG. 25 shows a schematic cross-section of a chip with an IR source and an IR detector integrated on the same chip with partitions in between to prevent direct IR radiation between the two devices, as well as a thin back-side film that is opaque to IR radiation.

FIG. 25 shows a diode IR Detector and IR Emitter on the same chip with a thin film coating 26 on the back of the chip. The coating is made of a material opaque to IR to prevent IR radiation travelling from the source to detector from the back side.

Figure 26:
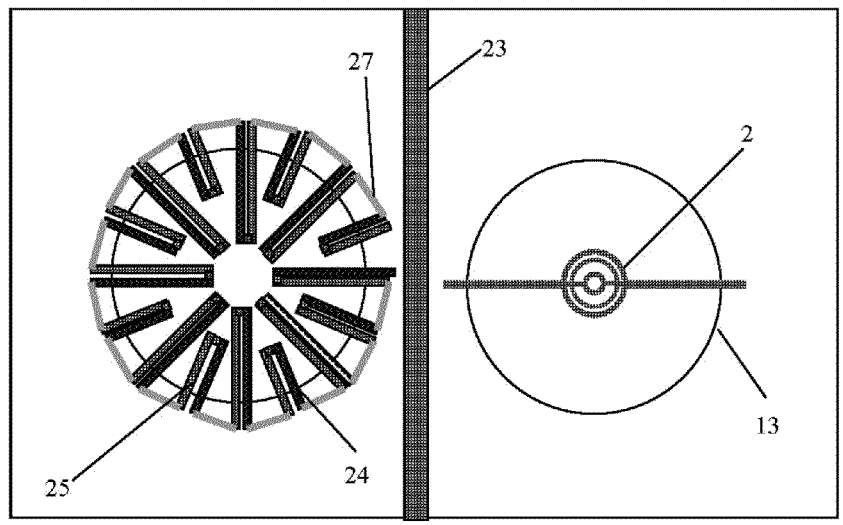
FIG. 26 shows a top view of a chip with an IR source and a thermopile IR detector integrated on the same chip.

FIG. 26 shows the top view of a chip with an IR source and a thermopile IR detector. In this case the thermopile consists of several thermocouples made of p-doped silicon and tungsten connected in series, the connection 27 can be made from any layer in the process, typically one of the metal layers, although single crystal silicon or polysilicon are also a possibility. The arrangement of thermocouples is shown as an example, and many different arrangements or number of thermocouples can be used.

Figure 27:
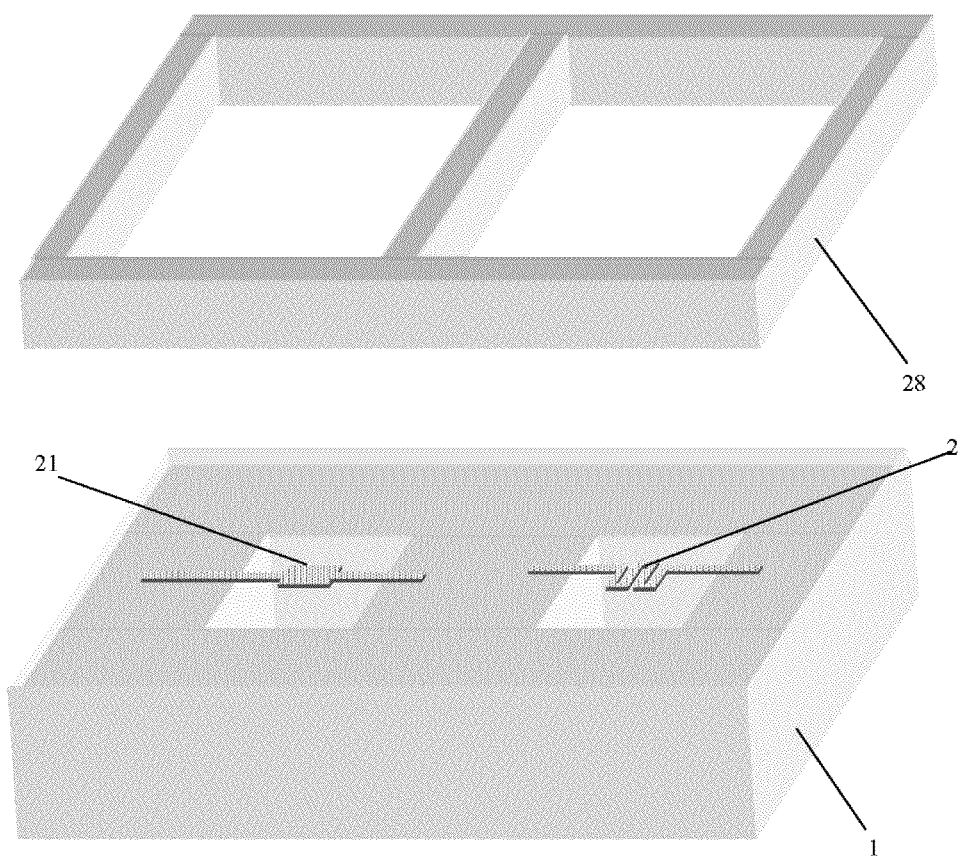
FIG. 27 shows a 3D schematic of a chip with both an IR emitter and a detector, and also shows a patterned substrate for wafer-bonding onto the chip.
Figure 28:
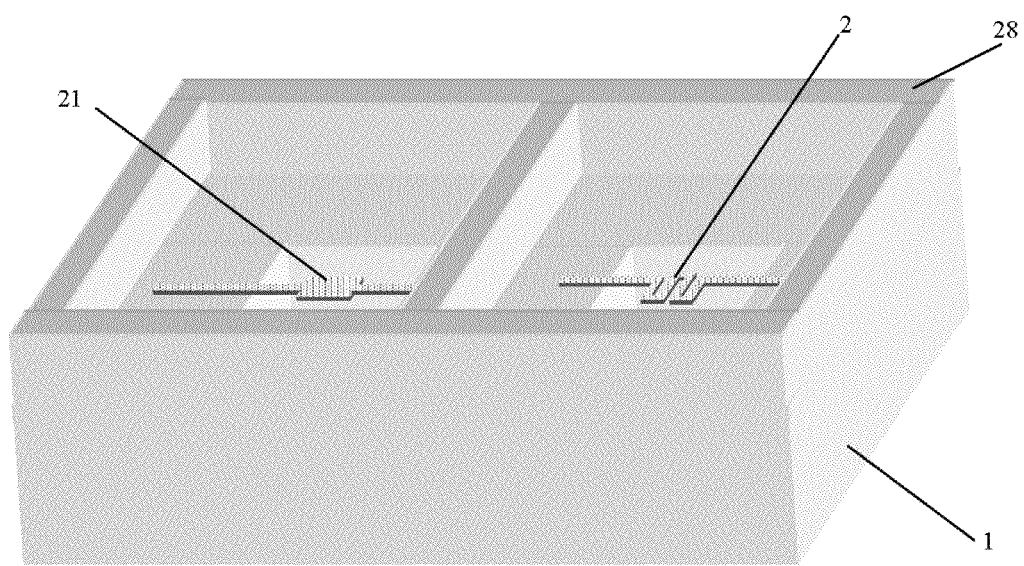
FIG. 28 shows a 3D schematic of a chip with both IR emitter and detector wafer with a substrate wafer bonded onto it to prevent IR emission travelling directly from the emitter to the detector.

FIGS. 27 and 28 show a wafer bonding technique to ensure that no IR radiation travels in a short path between the source and detector. For this purpose a substrate 28 is patterned and wafer bonded on the chip so as to create a partition between the source and detector. FIG. 27 shows a chip with an IR emitter and detector side by side, and a substrate patterned for wafer bonding onto the chip. FIG. 28 shows a chip with both an IR emitter and detector which are separated by the use of wafer bonding.

Figure 29:
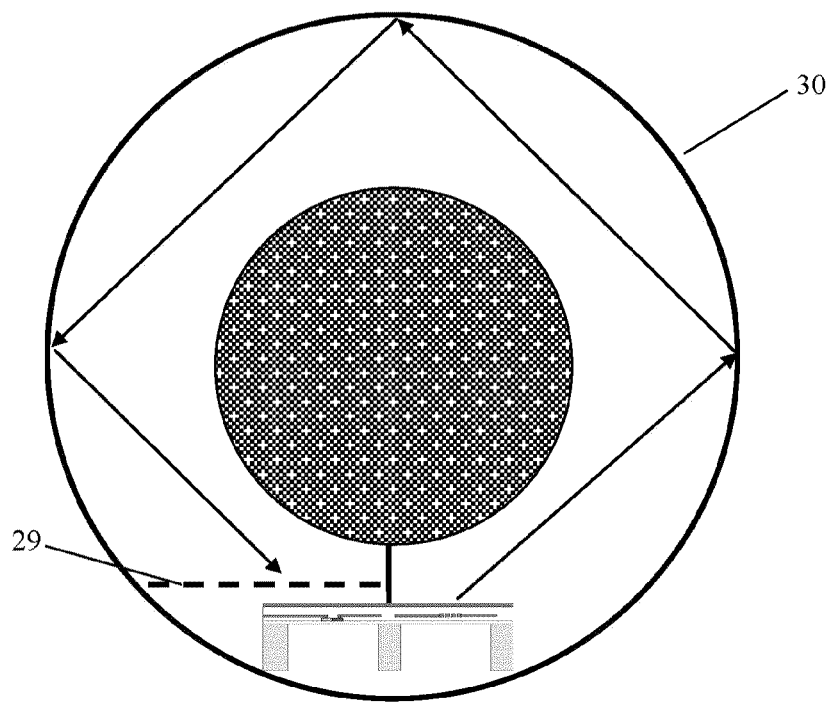
FIGS. 29, 30 show the chip packaged as an NDIR sensor.

FIG. 29 shows the schematic plan view of the chip with integrated emitter and detector in a circular package 29 for use as an NDIR sensor. It consists of a circular optical path from the IR source on the chip to the IR detector. The sidewalls of the path are made from a reflective material to allow the IR radiation to reflect off it to the detector. An optical filter 30 is packaged near the detector to only allow the wavelengths of interest through.

Figure 30:
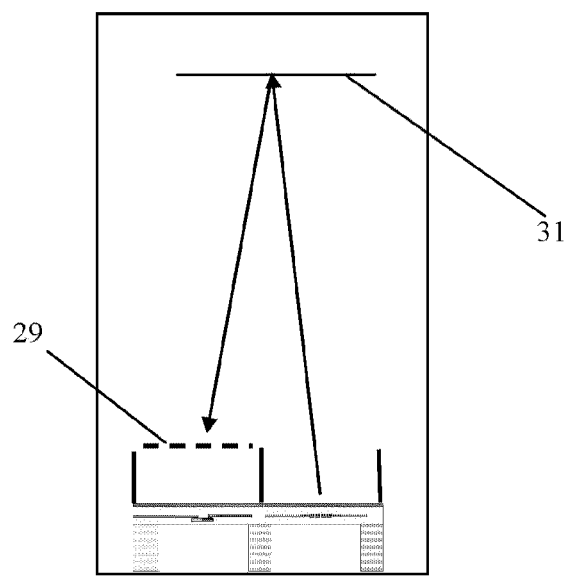

FIG. 30 shows the schematic plan view of the chip in a rectangular package with a reflective surface 31 at the far end to reflect the emission to the detector.

The invention claimed is:

1. An IR source comprising:
   a dielectric membrane formed on a semiconductor substrate comprising an etched portion, and
   a resistive heater formed within the dielectric membrane;
   wherein the resistive heater comprises a CMOS usable metal and the dielectric membrane is a CMOS dielectric membrane.

2. The IR source according to claim 1, wherein the CMOS usable metal comprises at least one layer of tungsten.

3. The IR source according to claim 1, wherein the dielectric membrane is fabricated on a starting substrate comprising an SOI or silicon wafer.

4. The IR source according to claim 1, wherein the heater comprises a metal layer having a titanium/titanium nitride liner directly underneath the metal layer.

5. The IR source according to claim 2, wherein the tungsten layer is used as an interconnect metal in CMOS circuitry.

6. The IR source according to claim 1, further comprising one or more metal heat spreading plates directly above or below the heater.

7. The IR source according to claim 1, wherein there is a monocrystaline silicon heat spreading plate and/or a polycrystalline silicon plate directly below the heater, the plates being configured to reflect IR emission from the heater.

8. The IR source according to claim 1, integrated into a chip comprising control circuitry.

9. The IR source according to claim 1, further comprising a MOSFET in series with the heater to control the temperature of the heater.

10. The IR source according to claim 1, wherein the membrane is formed by a process chosen from DRIE, anisotropic wet etching, KOH and TMAH.

11. The IR source according to claim 1, formed as an array of micro-hotplates, each micro-hotplate comprising the resistive heater.

12. The IR source according to claim 11, configured so that all the micro-hotplates in the array are operable at the same time or individually.

13. The IR source according to claim 2 wherein the tungsten used for the heater is close to an axis of zero stress on the membrane.

14. The IR source according to claim 6, wherein the metal heat spreading plate is exposed by etching away the passivation.

15. The IR source according to claim 1, further comprising a temperature sensor embedded within the membrane and placed below the heater or adjacent to the heater, the temperature sensor including any of a diode temperature sensor (thermodiode), bipolar transistor temperature sensor (thermotransistor), resistive silicon temperature sensor and resistive metal temperature sensor.

16. The IR source according to claim 15, wherein the temperature sensor is as wide as the heater, or smaller, or larger than the heater.

17. The IR source according to claim 15, wherein the temperature sensor is configured to reflect IR emission from the heater.

18. The IR source according to claim 1, wherein a top surface of the membrane is provided with any of a silicon dioxide passivation layer and a silicon nitride passivation layer.

19. The IR source according to claim 1 wherein a top surface on the membrane is provided with a coating comprising a material selected from a group including polymer, carbon black, carbon nanotubes, graphene, and a material with high IR emissivity.

20. An IR source according to claim 19, where the coating is compatible with post-CMOS processing and is formed by one or more of CVD, local growth and ink-jet deposition techniques.

21. The IR source according to claim 1, further comprising mesh made of a CMOS metal layer placed on top of the resistive heater to increase the emissivity, and wherein the mesh size is chosen to filter the desired signal at particular wavelengths and/or to increase the emission at particular wavelengths.

22. The IR source according to claim 1, further comprising dots of a CMOS metal placed on top of resistive heater to increase the emissivity, and wherein the size of the dots and the distance between the dots are chosen to filter the desired signal at particular wavelengths and/or to increase the emission at particular wavelengths.

23. The IR source according to claim 1, further comprising an IR filter attached by means of wafer bonding.

24. The IR source according to claim 23, wherein the IR filter comprises a chip or wafer etched by DRIE to form one or more membranes comprising one or more silicon dioxide and silicon nitride.

25. The IR source according to claim 1, packaged with a reflector.

26. The IR source according to claim 1 packaged in a flip chip method.

27. An NDIR sensor comprising the IR source of claim 1 on a chip and an IR detector on a second membrane on the same chip.

28. An NDIR sensor according to claim 27, wherein the IR detector comprises a thermopile, the thermopile comprising one or more thermocouples.

29. An NDIR sensor according to claim 27, wherein the IR detector comprises one or more thermodiodes or thermotransistors.

30. An NDIR sensor according to claim 27, further comprising a partition created by a structure of via and metal layers between the IR source and detector.

31. An NDIR sensor according to claim 27, further comprising a partition created above the chip by wafer bonding of a patterned substrate.

32. An NDIR sensor according to claim 27, further comprising a partition created above the chip during packaging of the chip.

33. An NDIR sensor according to claim 28, wherein the IR detector comprises a mesh made of a CMOS metal layer placed on top of the thermopile to increase the sensitivity, and wherein the mesh size is chosen to filter the desired signal at particular wavelengths and/or to increase the signal at particular wavelengths.

34. An NDIR sensor according to claim 28, wherein the IR detector comprises dots of a CMOS metal layer placed on top of the thermopile to increase the sensitivity, and wherein the size of the dots and the distance between the dots are chosen to filter the desired signal at particular wavelengths and/or to increase the signal at particular wavelengths.

35. An NDIR sensor according to claim 27, wherein the NDIR chip is packaged in a cylindrical package such that there is a circular optical path from the source to the detector.

36. An NDIR sensor according to claim 27, further comprising an IR filter in an optical path of a package comprising the chip.

37. An NDIR sensor according to claim 27, further comprising a particle filter.

38. An NDIR sensor according to claim 27, further comprising an IR absorbing layer selected from a group comprising a polymer, carbon nanotubes, graphene, metal films, metal blacks and thin film stacks.

39. An NDIR source according to claim 38, where the IR absorbing layer is compatible with post-CMOS processing and is formed by any technique selected from CVD, local growth and ink-jet deposition.

40. A method of manufacturing an Infra-Red (IR) source using a CMOS process, the method comprising:
    forming a substrate;
    forming a dielectric layer on the substrate, and
    forming a resistive heater in or on the dielectric layer using a CMOS usable metal.

* * * * *